United States Patent
Mihai et al.

(10) Patent No.: US 12,199,954 B2
(45) Date of Patent: Jan. 14, 2025

(54) TRUSTED CYBER PHYSICAL SYSTEM

(71) Applicant: Microsoft Technology Licensing, LLC, Redmond, WA (US)

(72) Inventors: Daniel Stelian Mihai, Issaquah, WA (US); Brian Clifford Telfer, Seattle, WA (US); David Garfield Thaler, III, Redmond, WA (US); Stefan Thom, Snohomish, WA (US); Torsten Stein, Snohomish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/742,325

(22) Filed: May 11, 2022

(65) Prior Publication Data

US 2023/0035007 A1 Feb. 2, 2023

Related U.S. Application Data

(63) Continuation of application No. 15/934,489, filed on Mar. 23, 2018, now Pat. No. 11,411,933.
(Continued)

(51) Int. Cl.
*H04L 9/40* (2022.01)
*G06F 13/10* (2006.01)

(52) U.S. Cl.
CPC ........ *H04L 63/0428* (2013.01); *G06F 13/102* (2013.01); *H04L 63/168* (2013.01)

(58) Field of Classification Search
CPC .. H04L 63/0428; H04L 63/168; G06F 13/102
See application file for complete search history.

(56) References Cited

U.S. PATENT DOCUMENTS 10,860,305 B1\* 12/2020 Harland ............... H03K 19/177
2011/0090541 A1\* 4/2011 Harper .................. G06V 40/13
715/705
(Continued)

OTHER PUBLICATIONS

Beekman, et al., "Improving Cloud Security using Secure Enclaves", UC Berkeley Electronic Theses and Dissertations, Jan. 1, 2016, retrieve from: https://jbeekman.nl/publications/phd-dissertation.pdf, pp. 1-72.
(Continued)

*Primary Examiner* — Kevin Bechtel
*Assistant Examiner* — Forrest L Carey
(74) *Attorney, Agent, or Firm* — Mark K. Young; Mark Young PC

(57) ABSTRACT

A brownfield security gateway is configured to support a trusted execution environment (TEE) that employs cryptographic and physical security—which forms a trusted cyber physical system—to protect sensitive transmissions on route to a controllable device. The gateway may be implemented with a System on Chip (SoC) that utilizes an application layer gateway to filter content within a transmission. When the application layer gateway authorizes the transmission, the transmission is forwarded to a trusted peripheral device that is configured with communication transport protocols, and the trusted peripheral device transfers the transmission to the controllable device. The trusted peripheral device and the controllable device are physically protected by, for example, protected distribution systems. Accordingly, the trusted peripheral device functions as a gateway between the SoC and the controllable device.

20 Claims, 11 Drawing Sheets

Related U.S. Application Data

(60) Provisional application No. 62/634,782, filed on Feb. 23, 2018.

(56) References Cited

U.S. PATENT DOCUMENTS

| | | | | | |
|---|---|---|---|---|---|
| 2014/0095890 | A1* | 4/2014 | Mangalore | ............. | G06F 21/60 |
| | | | | | 713/189 |
| 2014/0289794 | A1* | 9/2014 | Raleigh | ................ | H04L 63/20 |
| | | | | | 726/1 |
| 2014/0380425 | A1* | 12/2014 | Lockett | ................ | G06F 21/00 |
| | | | | | 726/4 |
| 2016/0173524 | A1* | 6/2016 | Lietz | .................... | G06F 21/577 |
| | | | | | 726/25 |
| 2016/0381405 | A1* | 12/2016 | Smith | ............... | H04N 21/8355 |
| | | | | | 725/28 |
| 2017/0244565 | A1* | 8/2017 | Bronk | ................ | H04W 12/106 |
| 2017/0317984 | A1* | 11/2017 | Ollikainen | ............ | H04W 12/02 |
| 2019/0245856 | A1* | 8/2019 | Irwan | ................... | H04L 63/101 |

OTHER PUBLICATIONS

Communication pursuant to Article 94(3) EPC Received for European Application No. 20714782.8, mailed on Apr. 11, 2024, 6 pages.

* cited by examiner

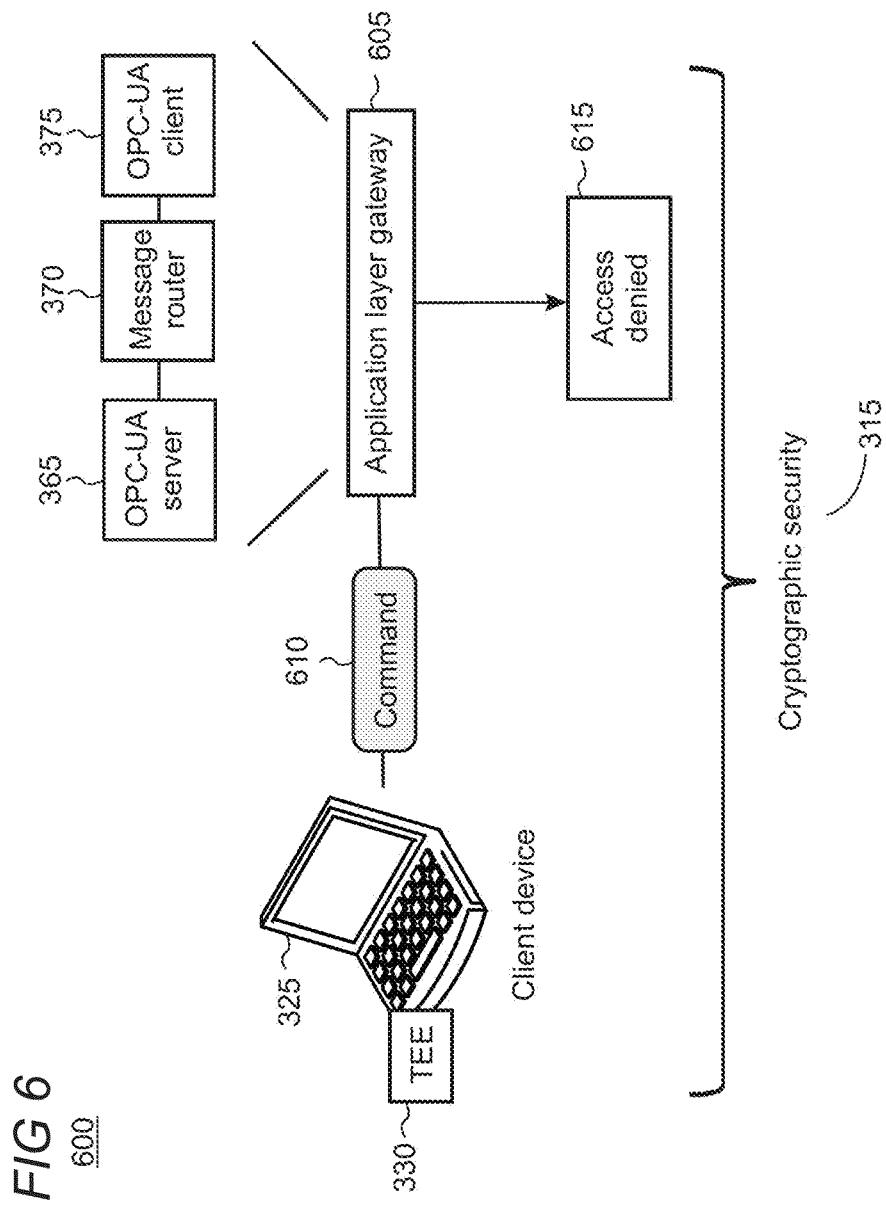

1000

1100

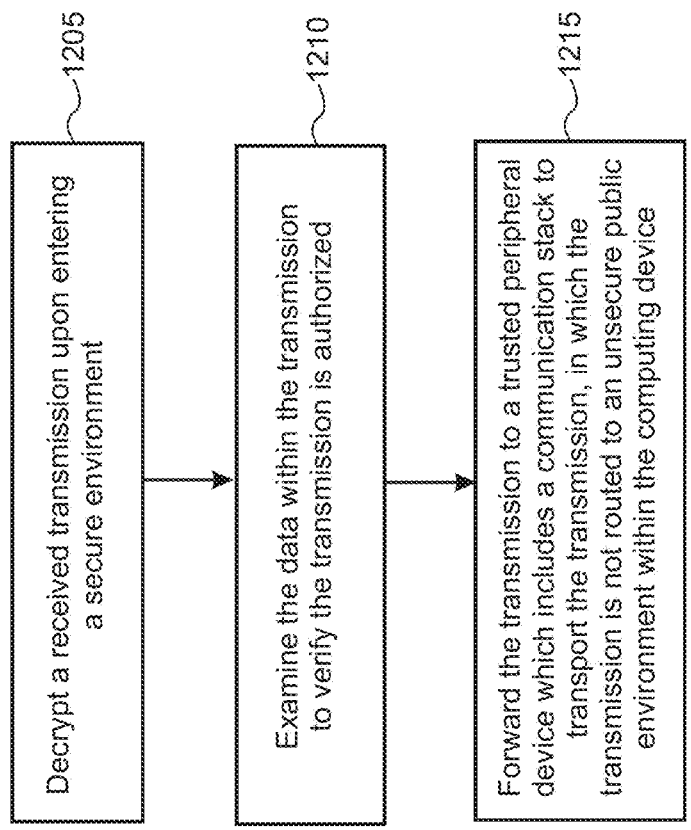

TRUSTED CYBER PHYSICAL SYSTEM

CROSS-REFERENCE TO RELATED APPLICATIONS

This application is a continuation of and claims priority to U.S. patent application Ser. No. 15/934,489, filed on Mar. 23, 2018 entitled "Trusted Cyber Physical System," which claims benefit and priority to U.S. Provisional Application Ser. No. 62/634,782 filed Feb. 23, 2018, entitled "Trusted Cyber Physical System," the disclosures of which are incorporated herein by reference in their entirety.

BACKGROUND

Equipment, systems, and sub-systems utilized, for example, in infrastructure and industrial applications may typically be operated using controller devices that are accessible by multiple parties including administrators, cloud service providers, and end users. Such multiple points of access can expose vulnerabilities to malicious attacks such that the infrastructure owner/operator loses control of critical systems.

Furthermore, firewalls are not necessarily an ideal solution to protect from such malicious attacks. Firewalls can be susceptible to bugs (e.g., in the communications stack or in the firewall code itself) that may result in an attacker being able to inject executable code. Such executable code can then bypass the firewall and communicate with and thereby expose applications, files, data, and the like.

SUMMARY

A brownfield security gateway, configured to support a trusted execution environment (TEE) and a trusted peripheral device that is configured with communication transport protocols (e.g., TCP/IP stack), is utilized to securely isolate access and control to connected controllable devices, such as infrastructure components and hardware (e.g., a valve, actuator, robotic system, etc.). As an example, the TEE can be configured according to specifications promulgated by the GlobalPlatform® standard, although other methodologies and/or standards may also be utilized. The TEE may at least satisfy minimum requirements in which the computing device has a unique security identity, any code inside the TEE is operator-authorized, and any data inside the TEE cannot be read by code outside the TEE. Non-exhaustive examples of TEEs include Intel's® Software Guard Extensions (SGX) and ARM's® TrustZone®.

The brownfield security gateway receives transmissions, such as commands or information, from a cloud service, user device or edge compute unit that are destined for a controllable device which operates responsively thereto. The gateway may be implemented with a System on Chip (SoC) that utilizes an application layer gateway, such as a proxy server and a proxy client, to filter the received transmissions. The application layer gateway examines the received transmissions, and authorized transmissions are sent to the trusted peripheral device. Although the trusted peripheral device can be configured as a TEE, such configuration is not necessary since it may only communicate with the TEE of the SoC. The communication transport protocols are utilized at the trusted peripheral device to forward authorized transmissions to the destination controllable device to thereby facilitate gateway functionality within the TEE.

Cryptography is utilized to secure communications and data transmissions up until the data is decrypted upon entering the TEE. After decryption, the data traverses through the application layer gateway within the SoC which applies criteria to determine authorized access (i.e., whether to permit or deny the data from being forwarded to the controllable device). For example, illegitimate and/or malicious data can be denied transport to the controllable device, whereas data from a legitimate source can be permitted. For example, the filters can be configured to verify that the originator of the transmission is authorized, and the content within the transmission is not malicious.

When the application layer gateway authorizes the transmission of the data, it transfers the data to the trusted peripheral device which is accessible only from within the TEE. The trusted peripheral and controllable devices are typically protected with physical, real-world security features, such as those provided by protected distribution systems, to prevent physical intrusions into the transport stream which can jeopardize proper operations. The trusted peripheral device provides enhanced security by only being accessible by the TEE of the SoC while being physically protected. Thus, the entire network—from the system originating the transmission to the controllable device—is securely protected at all times, whether through cryptography, operations within the TEE, or via physical security. The combination of the TEE and cryptographic and physical security forms the trusted cyber physical system.

Although the disclosure herein discusses transmissions originating from particular sources (e.g., a client device) and traveling through the trusted cyber physical system to the controllable device, the same system can provide security and operate in the reverse as well. For example, the controllable device may be a secure device that stores confidential information, such as personal financial information or other confidential records, that can transmit data through the trusted cyber physical system to a requesting or other target device. The transmission from the controllable device may be synchronous in that the controllable device receives a request and subsequently processes the request for confidential data, in which the veracity of this request may first be verified by the application layer gateway. After the controllable device processes the request, the controllable device can transmit the data within the secure environment, such as through the trusted peripheral device, through the TEE of the SoC which encrypts the data, and then the encrypted data is transmitted over a network to the requesting device. Alternatively, the transmission from the controllable device may be asynchronous such that the controllable device transmits data without an initial request.

The isolation of control and access to a controllable device enabled by the brownfield security gateway provides security benefits. For example, using the gateway enables only authorized administrators (e.g., the owner or operator) to access, control, or modify data or commands for the controllable device, as the manufacturer of the SoC is considered trustworthy. Accordingly, the gateway removes control from all outside actors who may attempt to execute software or other commands through various forms of access to the controllable device. Such outside actors can include operating system (OS) maintainers, application maintainers, tool maintainers, cloud service providers, government entities, and the like.

The utilization of the brownfield security gateway enhances security as all transmissions to the controllable device traverse through the secure TEE up to the point in which physical security is implemented in the environment. This avoids the risk of transporting the command back through a communication transport stack in a rich execution environment, which is susceptible to malicious attacks. The gateway can also be configured to perform and provide additional security enhancements, including for example, baseline policy enforcement in which minimum and/or maximum operational criteria for controllable devices can be maintained in the gateway, and controllable device operations logging.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 6 shows an illustrative application layer gateway denying a command;

FIGS. 10-12 show illustrative processes performed by the various components within the brownfield security gateway.

DETAILED DESCRIPTION

Figure 1:
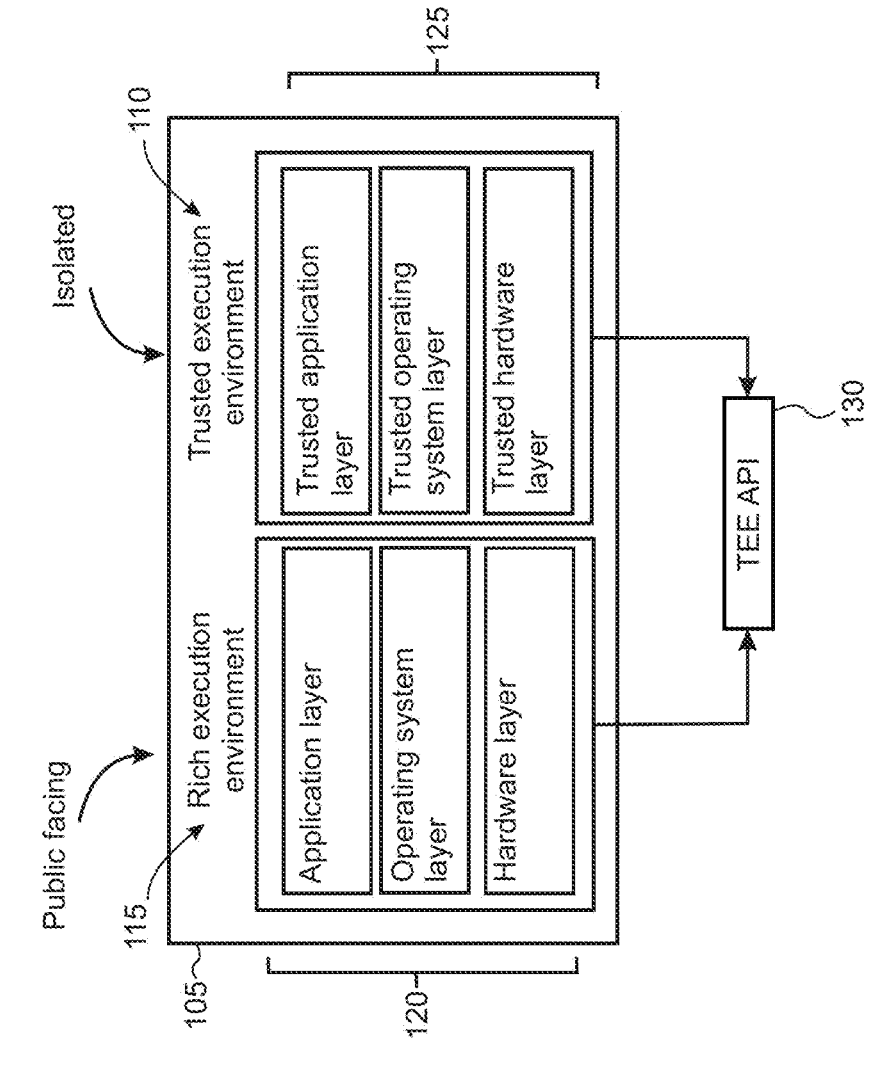
FIG. 1 shows an illustrative architecture with a rich execution environment (REE) and a trusted execution environment (TEE)

FIG. 1 shows an illustrative architecture 100 of a computing device 105 having a rich execution environment (REE) (hereinafter referred to as a "public environment") 115 running parallel to a trusted execution environment (TEE) 110. As illustratively shown, the public environment may face the public and thereby be subjected to additional exposure and security risks. In contrast, the TEE may operate securely in isolation from the public environment to perform operations that are of a more sensitive nature. Such sensitive operations can include the handling of confidential personal information, banking data, and the control of systems such as critical infrastructure, as discussed in further detail below. The present trusted cyber physical system uses the example of controlling critical infrastructure as an example, but other implementations and uses are also possible.

As illustratively shown in FIG. 1, the public environment and the TEE have conventional computing configurations to operate. In simplified form, the public environment and TEE each include application, operating system, and hardware layers (collectively represented by numerals 120 and 125), although the TEE is isolated and the hardware and software therein are considered trusted. The TEE and public environments can be configured according to specifications promulgated by the GlobalPlatform® standard, although other methodologies and/or standards may also be utilized. The TEE may at least satisfy minimum requirements in which the computing device has a unique security identity, any code inside the TEE is operator-authorized (e.g., such that the TEE can be enforced using hardware so that malware that is attempted to be injected into the TEE via a buffer overrun cannot be executed by the secure processor), and any data inside the TEE cannot be read by code outside the TEE.

The application layers support various applications that are executable by the operating system. The public facing application layer can support applications such as a browser, messaging applications, and the like, whereas the application layer in the TEE can support trusted applications. In a system dedicated for critical infrastructure, the trusted applications can include a trusted application gateway which monitors and controls all transmissions that seek to traverse the TEE, thereby allowing or denying access. Other exemplary environments can include the banking industry, in which to process transactions, any personal customer information is executed by a trusted banking application executing in the TEE.

The operating system layers can manage system operations in which the hardware and application layers operate. In the public environment, the operating system (OS) can include Windows®, whereas the TEE can run a secure OS which runs parallel to the public OS. The OS layers can each support a TEE application programming interface (API) 130 which provides the interoperability of the two environments. That is, a client TEE API in the public environment can be used to commence a session with the TEE and thereby allow the TEE to execute a trusted application.

Figure 2:
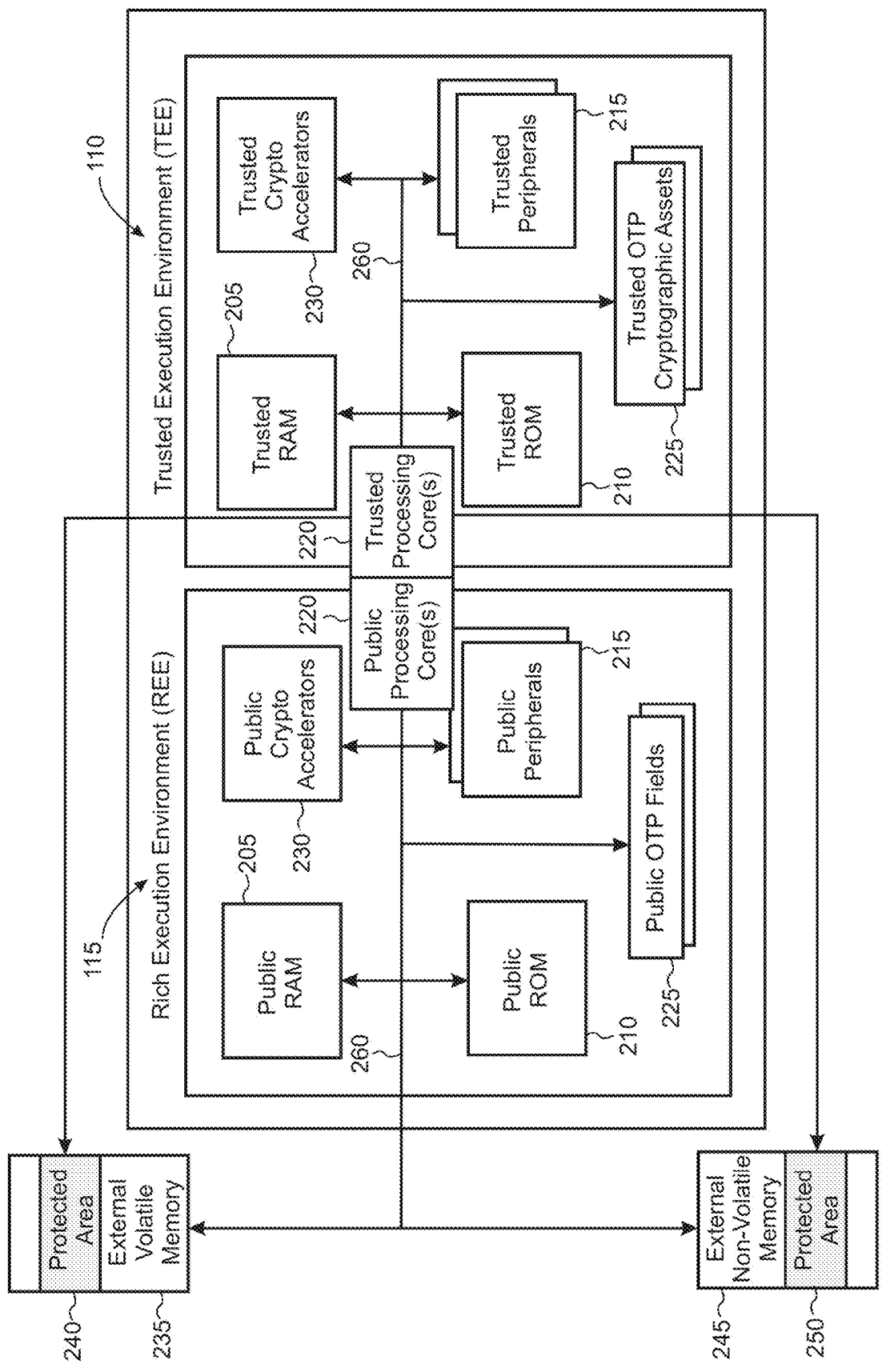
FIG. 2 shows an illustrative hardware architecture of the rich execution environment and the trusted execution environment.

The hardware layers support processors and memory, as depicted in FIG. 2. Although the public environment and TEE are illustratively shown as operating distinctly from each other, the various hardware components can be partitioned such that portions of the hardware are dedicated for only public operations, and portions of the hardware are dedicated for only trusted operations. This partitioning of the components and system provide the secure isolation offered by the TEE.

FIG. 2 shows exemplary hardware of the computing device 105, which utilizes the public environment (i.e., rich execution environment 115) and TEE 110. As shown, the hardware components can be partitioned to isolate the TEE from the public environment. The public environment and TEE each include similar components which operate distinctly from the other environment. As illustratively shown, the various components include random access memory 205, read-only memory 210, peripherals 215 (e.g., input/output devices), processing core(s) 220, one-time password (OTP) fields 225, and crypto accelerators 230. In one exemplary embodiment, the public environment can utilize external volatile memory 235 and external non-volatile memory 245, and a portion of the memories can have a protected area dedicated exclusively for the TEE, as representatively illustrated by numerals 240 and 250. The diagram illustrated in FIGS. 1 and 2 are illustrative only, and other configurations that satisfy the secure environment offered by the TEE are also possible.

Figure 3:
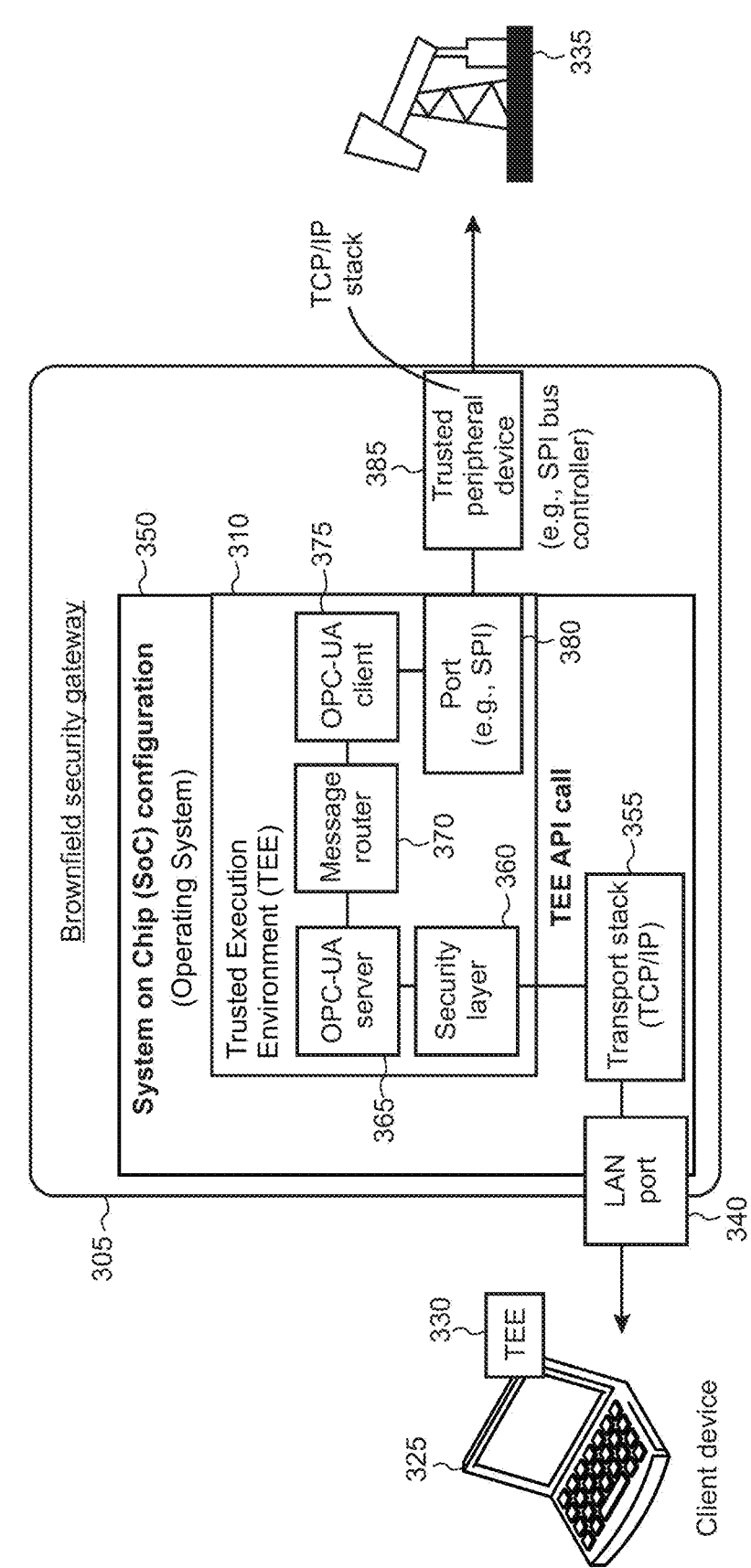
FIG. 3 shows an illustrative environment of a brownfield security gateway having a System on Chip (SoC) device and a trusted peripheral device.

FIG. 3 shows an illustrative environment 300 that utilizes a brownfield security gateway 305 configured with a TEE 310, as described above with respect to FIGS. 1 and 2. The environment 300 goes beyond a typical cyber physical system, e.g., a system that integrates computational and physical capabilities, and utilizes cryptographic security 315 and physical (e.g., real-world) security 320 to protect important data transmissions and commands. The utilization of the TEE within the gateway 305 bridges the gap between the cryptographic security and the physical security. This utilization and combination of security features provides a trusted cyber physical system for an owner or operator.

The trusted cyber physical system includes a client device 325 which is configured with a TEE 330. The operator of the client device may be an owner, administrator, or otherwise authorized to communicate in the present environment. Although the client device is depicted as a laptop computer, the client device may alternatively be an edge compute unit or other computing device.

Within this secure environment, the client device 325 may transmit data, such as a command, information, and the like, that is destined for a controllable device 335. In this example, the controllable device is a crane utilized in an oil field, but other devices can also be utilized in the environment, such as actuators, sensors, equipment used for critical infrastructure, computing devices, and types of brownfield devices. A brownfield device may be one in which legacy IT (Information Technology) systems (e.g., software, hardware) are used, and further developments are based on these legacy systems. In contrast to brownfield is greenfield development, which begins development from scratch. Thus, although an embodiment in which a transmission to control a crane is utilized herein, the present trusted cyber physical system can be utilized to facilitate increased security for other controllable devices, brownfield or otherwise.

Figure 5:
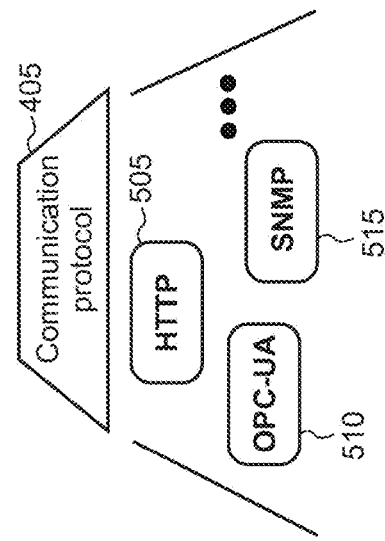
FIG. 5 shows illustrative communication protocols.
Figure 4:
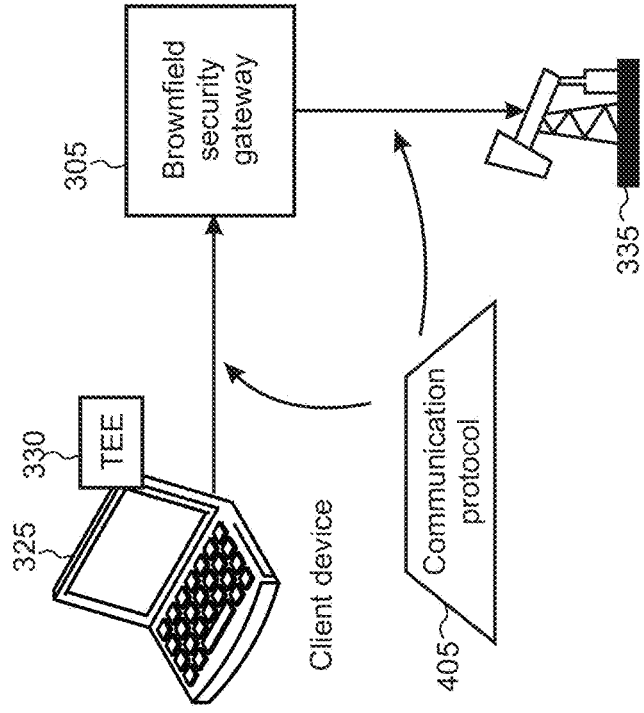
FIG. 4 shows illustrative communications within the environment shown in FIG. 3.

Data transmission from the client device 325 is not restricted to any particular type of communication protocol. For example, FIG. 4 shows illustrative communications within the environment of FIG. 3, in which communications are transmitted from the client device 325 to the brownfield security gateway 305, and ultimately to the controllable device 335. A communication protocol 405 is utilized for this transmission. FIG. 5 provides exemplary and non-exhaustive examples of communication protocols 405 that can be utilized for the present trusted cyber physical system or other systems that adopt the present architecture depicted in FIG. 3. For example, communication protocols include HTTP (HyperText Transfer Protocol) 505, OPC-UA (Open Platform Communications-Unified Architecture) 510, and SNMP (Simple Network Management Protocol) 515, among others. For the purposes of the present application, OPC-UA protocols are depicted.

Referring to FIG. 3, the encrypted transmission from the client device can travel over a network (not shown) and enter the System on Chip (SoC) 350 configuration through a LAN (Local Area Network) port 340 on the gateway 305. The encrypted transmission is broken down by the communication transport stack (e.g., TCP/IP) 355, and then enters the TEE 310. A TEE API call may be utilized to facilitate the transmission from the public environment to the TEE. The security layer 360 is used to decrypt the transmission. For example, although the security layer can depend on the protocol, SSL (Secure Sockets Layer) is one example of a security layer which is configured to decrypt the message or transmission. The transmission is therefore only in decrypted form within the TEE.

The gateway may use other computing devices and configurations other than the SoC as well, so long as the implemented computing device is configured with components such as a processor, memory, and, for example, the hardware and configurations shown in exemplary FIGS. 1-3. Thus, the SoC component may alternatively be considered a computing device, proxy device, a trusted device to denote the TEE, and the like, configured to perform the functions described herein for the SoC.

After decryption, the transmission traverses through a series of content filters that verify and validate the message for forwarding to the controllable device. In this example, OPC-UA server 365, OPC-UA client 375, and a message router 370 are utilized. Collectively, these components operate as an application layer gateway that can either permit or deny certain communications destined for the controllable device.

FIG. 6 shows an exemplary environment 600 in which an application layer gateway 605 is formed collectively from the OPC-UA server, client, and message router. The application layer gateway examines and filters messages so that only those that satisfy certain criteria are permitted. For example, only communications from an authorized source (e.g., a system administrator) can command the controllable device. In addition, and depending on the configuration, the application layer gateway can filter content within the received packets, e.g., to withstand malicious illegitimate and/or malicious data. As depicted in exemplary FIG. 6, the command 610 has been denied 615 after the application layer gateway filtered the content and determined the command did not satisfy one or more criteria within the application layer gateway.

Figure 7:
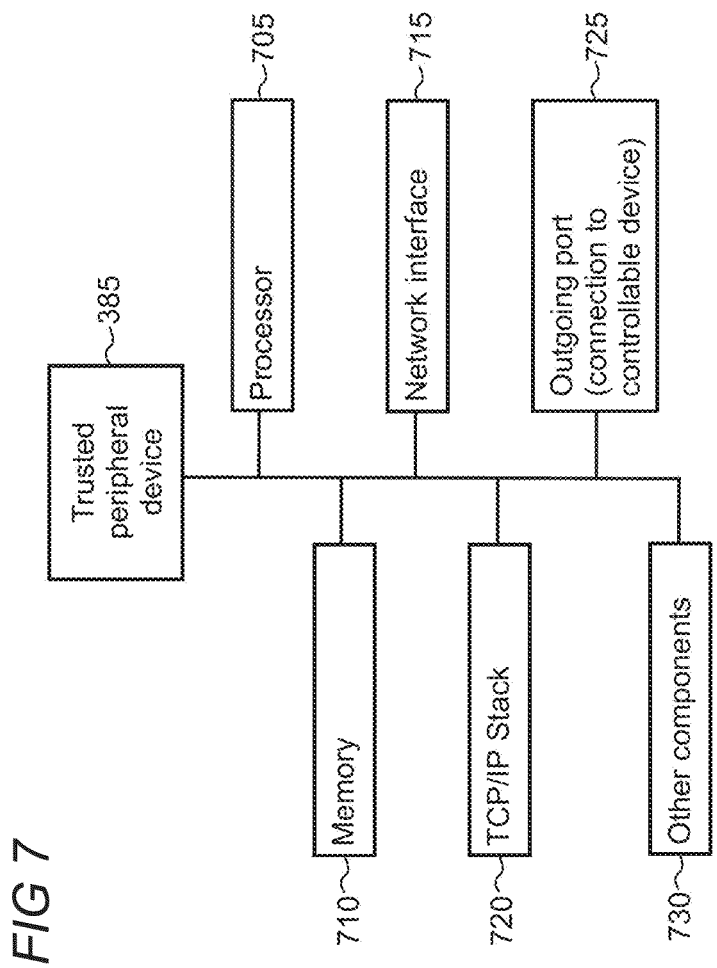
FIG. 7 shows an illustrative taxonomy of components within the trusted peripheral device.

If the transmission is approved by the application layer gateway, the transmission is transferred to an external port (e.g. SPI bus 380) to a trusted peripheral device 385. Although an SPI bus is illustrated, other busses, parallel ports, shared memory, or other communication mechanisms may also be utilized between the SoC and trusted peripheral device. FIG. 7 shows illustrative components that can form the trusted peripheral device, including a processor 705, memory 710, network interface (e.g., SPI) 715, TCP/IP stack 720, an outgoing port (connection to controllable device) 725, and other components 730.

The trusted peripheral device 385 is configured with the TCP/IP stack to receive the transmission from the SoC 350 and function as a gateway to the controllable device 335. The communication transport stack supported on the trusted peripheral device transforms the trusted peripheral device into a communicatory gateway, as opposed to a trusted peripheral device that functions as an endpoint. The trusted peripheral device is only accessible through the TEE of the SoC, and maintains the integrity of the secure environment by implementation of the application layer gateway and, as discussed below, physical security. This configuration provides at least the advantage for which the TEE does not transport the message back through to the transport stack 355, which may be in an exposed area of the SoC, such as the public environment. Therefore, after examination by the application layer gateway, the message destined for the controllable device only traverses through the TEE on the SoC, until the message is transmitted to the trusted peripheral device and controllable device. In turn, this configuration reduces the exposure of the message to the public environment, which is more vulnerable to attacks such as malware, kernel drivers, root kits, and the like. For increased security and to satisfy the requirements for the TEE, the trusted peripheral device may only connect to and correspond with the outgoing port 380 of the SoC, which operates within the TEE, and the controllable device.

In addition, the trusted peripheral device 385 is kept under physical security 320 like the controllable device. Physical security can include, for example, personnel, gates, barriers, locks, protected distribution systems, hardened carriers, etc. This physical security can prevent physical intrusions into the transport stream which can jeopardize operations. Collectively, the application layer gateway of the SoC, the trusted peripheral device separating the SoC from the controllable device, the isolation of the port 380 from the rich execution environment of the SoC, and the trusted peripheral device configured with the TCP/IP stack, form the trusted cyber physical system. This configuration is provided so only an authorized administrator, operator, or owner has control of the controllable device, while providing no access to outside contractors or personnel who may perform a separate function. For example, a cloud service or application provider that serves other parts of the system has no reason to access the controllable device, particularly in situations where the controllable device performs critical infrastructure tasks for industries such as energy, water supply, etc. Thus, the present gateway configuration provides an added level of security so that only intended authorized users can access and control the controllable device.

Figure 8:
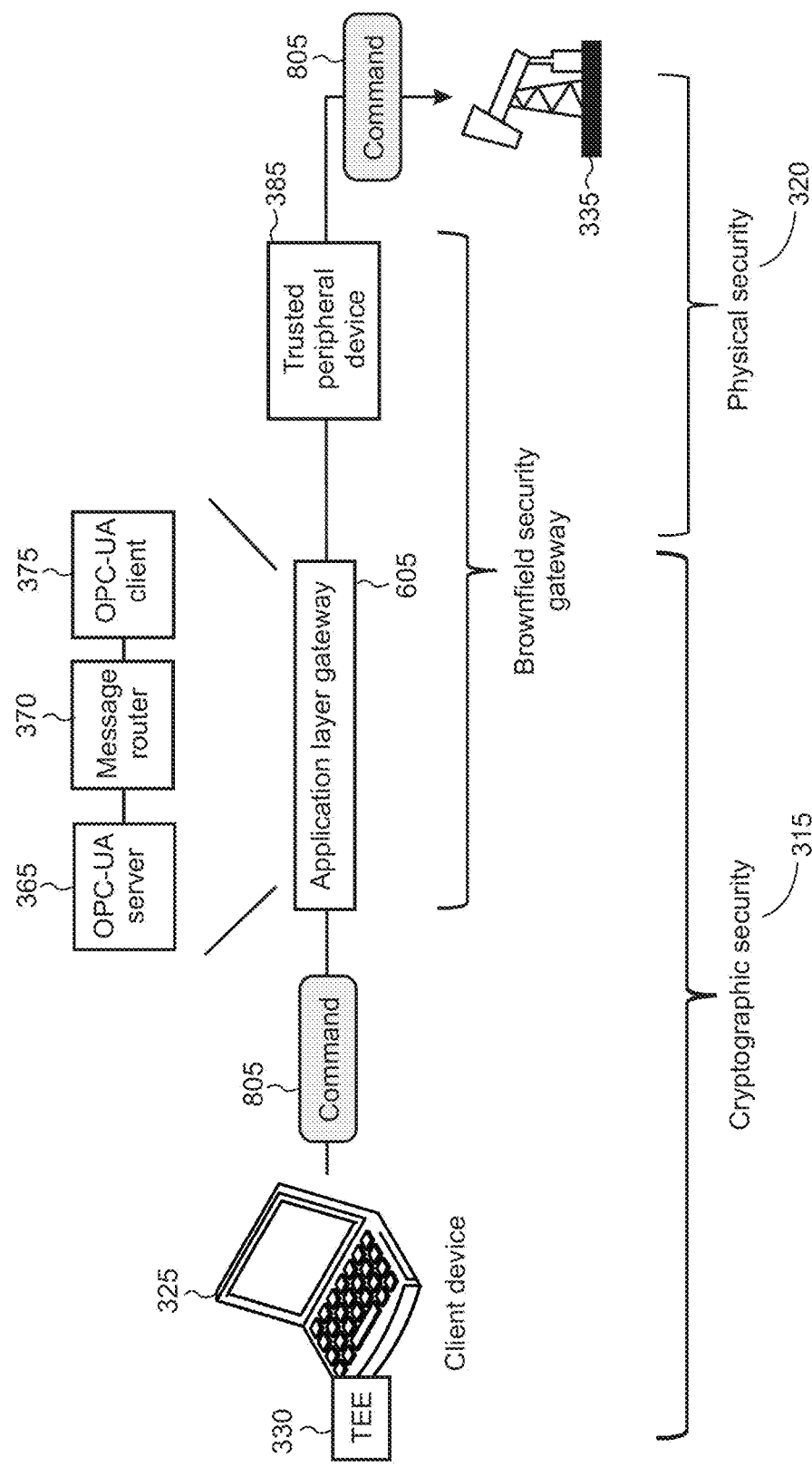
FIG. 8 shows an illustrative successful transmission of a command to a controllable device.

FIG. 8 shows an illustrative environment 800 in which a command 805 successfully arrives at the controllable device 335, and the controllable device responsively performs a function. As discussed above, the command is not limited to a particular controllable device, component, or hardware, but rather can include other embodiments. Thus, the command may be to perform an action such as turn on or off a machine or component of a machine, increase or decrease productivity of a machine, increase or decrease speed and other operational criteria, etc. In alternative environments, the command may be to execute a financial transaction or a request to retrieve information, such as confidential information.

As depicted in FIG. 8, the command is filtered and approved by the application layer gateway 605 (e.g., by passing through to the next stage), properly transported by the communication TCP/IP stack of the trusted peripheral device 385, and ultimately routed to the controllable device 335.

The brownfield gateway security may additionally be configured to translate the command so that the command is executable by the controllable device. For example, in an embodiment in which the controllable device requires a certain protocol, proprietary or otherwise, the application on the gateway can translate or interpret the original protocol from the originator of the command to the protocol operating within the gateway and the controllable device.

In addition to the embodiment shown in FIG. 8, where a transmission is transmitted from a client device 325 to a controllable device 335, transmissions can be securely made from the controllable device 335 to a client device, edge compute unit, cloud service, etc. Thus, the diagram in FIG. 3 also works in the reverse in that data and transmissions can be transmitted from the controllable device 335 to the client device 325 either synchronously (e.g., responsive to a request) or asynchronously (e.g., without receiving a request).

For example, the client device may transmit a request for information to the controllable device. The application layer gateway may verify that the request is authorized by applying criteria, pre-determined or otherwise, to the request, and thereby permit or deny the request. Requests that are authorized are processed by the controllable device and then transmitted to the trusted peripheral device, which can use its communications stack, if necessary, to assemble the message for transmission to the SoC. The application layer gateway may or may not apply any criteria to the transmission from the controllable device, since the original request has already been verified. The security layer 360 within the TEE can encrypt the transmission so that the data is never exposed beyond the TEE, trusted peripheral device, and controllable device. Once the data is encrypted, the data travels through the transport stack 355, out port 340, and over a network to the requesting device, such as client device 325.

Figure 9:
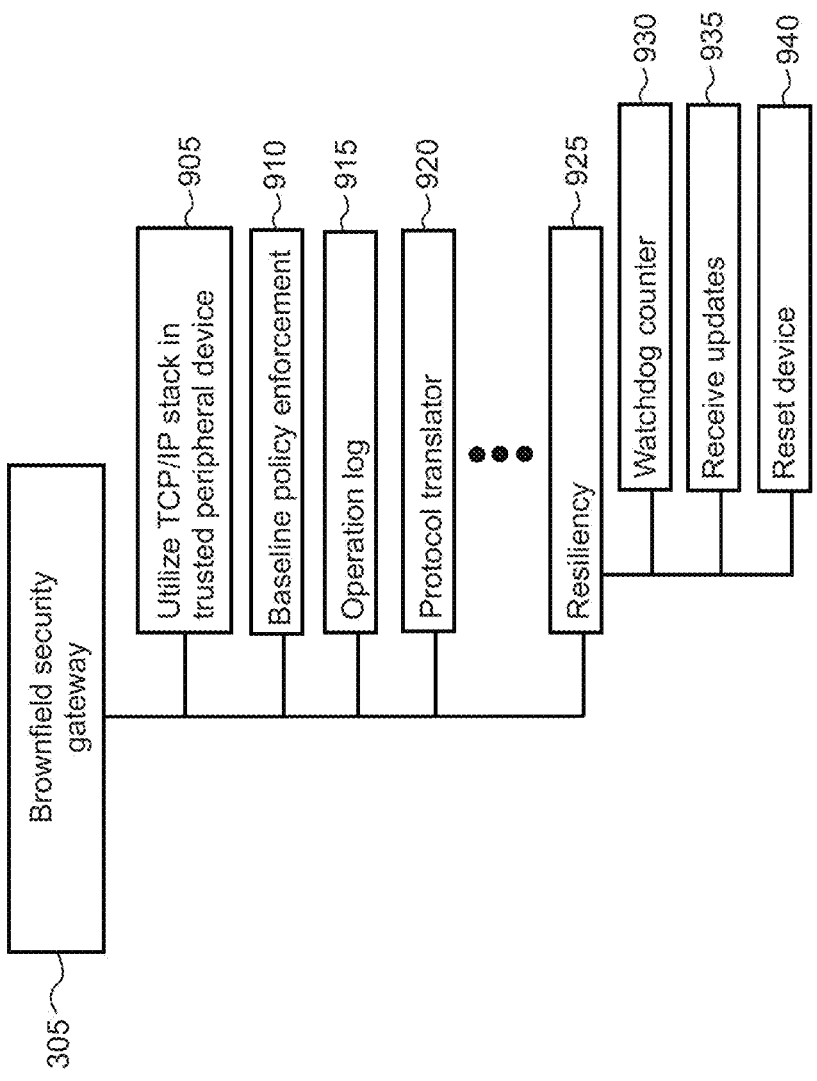
FIG. 9 shows an illustrative taxonomy of functions performed by the brownfield security gateway.

FIG. 9 shows a taxonomy of functions 900 in which the brownfield security gateway 305 can perform. Although particular functions are depicted in the taxonomy, the list is non-exhaustive and other functions are also possible. An illustrative function includes utilizing a TCP/IP stack in a trusted peripheral device 905, which thereby transforms a trusted peripheral device from an endpoint device into a gateway to the controllable device. Without the TCP/IP stack, the trusted peripheral device may be an endpoint device that performs received commands. Another illustrative function includes utilizing baseline policy enforcements 910, in which the brownfield gateway can be configured with one or more of minimum or maximum performance limits. For example, if a controllable device is understood to cause physical or structural harm if minimum and maximum operational limits are bypassed, then the gateway can deny the command or transmission so that it is never delivered to and executed by the controllable device.

The gateway may be configured with an operation log 915 that is in communication with a cloud service supported on a remote server (not shown). When the gateway seeks to create an action log upon the occurrence of an event, the gateway may communicate with the cloud service to log such activities. In one embodiment of the operation log, the gateway may log any modifications, commands, or other messages that are transmitted to the controllable device. Thus, if any negative consequences result (e.g., structural damage, physical harm) from the transmitted message, the operation log can be referenced. In another embodiment, the operation log may log actions only when the administrator overrides operational parameters that are set within the application layer gateway.

The gateway may also operate as a protocol translator 920. In an exemplary embodiment, when the controllable device operates in a brownfield environment, modern protocols (e.g., OPC-UA) can be translated to a proprietary protocol that better suits the particular equipment, brownfield or otherwise, or the owner of the equipment. As one example, a message initiated as OPC-UA may be translated to HTTP.

The gateway, for example using a trusted application operating within the TEE, can be configured for resilience 925 to malware and other vulnerabilities that may infect the public environment. Resilience can be achieved through various methods including utilizing a watchdog counter 930, receiving updates 935, and resetting device 940. The silicone within the one or more processors on the gateway can be configured with a watchdog counter, which resets the processor after a set period of time if a certain action is not periodically satisfied.

In one embodiment, the watchdog counter can be configured to require a cryptographic token which is transmitted from a cloud service. The cloud service provides the watchdog counter with the cryptographic token so the processing within the gateway can continue operations. If the gateway signifies to the cloud service, however, that its firmware or other systems are out-of-date, then the cloud service may force an update by not transmitting the cryptographic token. The gateway can either select an appropriate and convenient time to reboot and receive the update, or automatically reboot and update when the watchdog timer is not in compliance, that is, not satisfied. Similarly, if the public environment within the gateway is in a vulnerable state, such as infected with malware, then the device will ultimately reset by virtue of not satisfying the watchdog timer.

Figure 10:
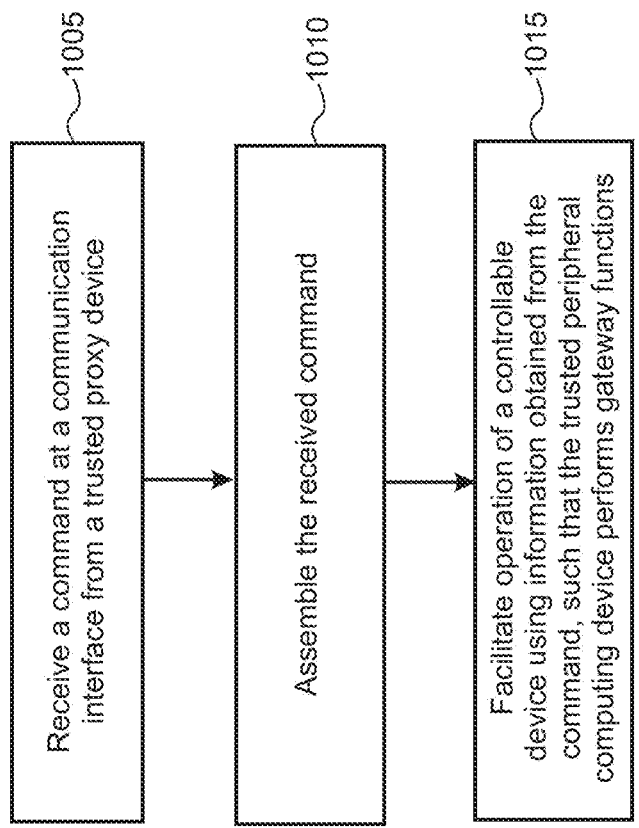

FIG. 10 is a flowchart of an illustrative method 1000 in which a trusted peripheral computing device functions as a gateway. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1005, a command is received at a communication interface of a trusted peripheral computing device. The command is from a trusted proxy device that can filter transmissions before the trusted peripheral computing device receives them. In step 1010, the received command is assembled. A TCP/IP stack (or other communication stack) supported on the trusted peripheral computing device can assemble the command. In step 1015, the trusted peripheral computing device facilitates an operation of a controllable device using information obtained from the command. The trusted peripheral computing device performs gateway functions between the trusted proxy device and the controllable device.

Figure 11:
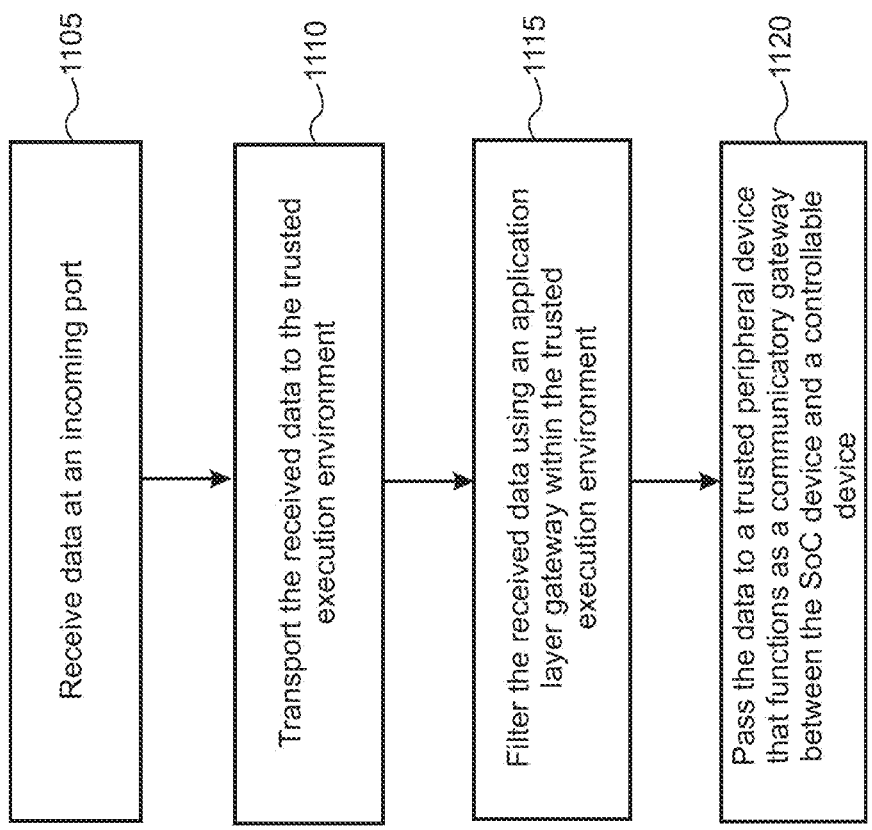

FIG. 11 is another flowchart of an illustrative method 1100 in which data is passed to a trusted peripheral device from an SoC device. In this embodiment, the trusted peripheral device and the SoC device form a brownfield security gateway. In step 1105, data is received at an incoming port of the brownfield security gateway. In step 1110, the received data is transported to a trusted execution environment within the SoC device. In step 1115, the received data is filtered using an application layer gateway within the trusted execution environment. In step 1120, the data is passed to the trusted peripheral device, which functions as a communicatory gateway between the SoC device and a controllable device. The trusted peripheral device is only accessible via the outgoing port within the TEE of the SoC device.

FIG. 12 is another flowchart of an illustrative method 1200 in which a transmission is forwarded to a communication stack on a trusted peripheral device, and the transmission does not enter an unsecure area (e.g., rich execution environment) of a computing device. In step 1205, a received transmission is decrypted upon entering a secure environment. In step 1210, data within the transmission is examined to verify the transmission is authorized. In step 1215, the transmission is forwarded to the trusted peripheral device which includes a communication stack to transport the transmission. As the transmission is forwarded to a trusted peripheral device operating within the secure environment, the transmission is not routed to and does not enter an unsecure public environment within the computing device. This process advantageously maintains additional security for the transmission in that the transmission does not become unnecessarily exposed to the public environment.

Referring back to FIGS. 2, the system architectures therein can be for a device capable of executing the various components described herein for the trusted cyber physical system. Thus, the architecture may be adapted for a brownfield security gateway 305, a SoC device 350, trusted peripheral device 385, client device 325, or other computing devices including a server computer, a desktop computer, a netbook computer, a tablet computer, and/or a laptop computer. The architecture may be utilized to execute any aspect of the components presented herein.

The architecture illustrated in FIG. 2 includes processing core(s) (e.g., Central Processing Unit(s)) 220, a system memory including a RAM 205 and a ROM 210, and a system bus 260 that couples the memory to the processing core(s). The components, such as the processing core(s), can be partitioned such that there is a public portion of the processing core(s) and a trusted portion of the processing core(s), or alternatively separate hardware can be dedicated to the public environment or the TEE. A basic input/output system containing the basic routines that help to transfer information between elements within the architecture, such as during startup, is stored in the ROM 210. The architecture also shows exemplary volatile memory external to the device as representatively shown by numerals 235 and 240. In this example, the external volatile memory includes a dedicated protected area for use with the TEE. The architecture further includes a mass storage device (representatively shown as external non-volatile memory 245 and 250) for storing software code or other computer-executed code that is utilized to implement applications, the file system, and the operating system. In this example, the external non-volatile memory includes a dedicated protected area for use with the TEE. Alternatively, the mass storage device can be internal to the device.

The mass storage device is connected to the processing core(s) 220 through a mass storage controller (not shown) connected to the bus 260. The mass storage device and its associated computer-readable storage media provide non-volatile storage for the architecture.

Although the description of computer-readable storage media contained herein refers to a mass storage device, such as a hard disk or CD-ROM drive, it may be appreciated by those skilled in the art that computer-readable storage media can be any available storage media that can be accessed by the architecture.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture. The computer-readable storage medium may not consist of propagating signals and be non-transitory.

According to various embodiments, the architecture may operate in a networked environment using logical connections to remote computers through a network. The architecture may connect to the network through a network interface unit (not shown) connected to the bus 260. It may be appreciated that the network interface unit also may be utilized to connect to other types of networks and remote computer systems. The architecture also may include an input/output controller (not shown) for receiving and processing input from a number of other devices, including a keyboard, mouse, or electronic stylus (not shown in FIG. 2). Similarly, the input/output controller may provide output to a display screen, a printer, or other type of output device (also not shown in FIG. 2).

It may be appreciated that the software components described herein may, when loaded into the processing core(s) 220 and executed, transform the processing core(s) 220 and the overall architecture from a general-purpose computing system into a special-purpose computing system customized to facilitate the functionality presented herein. The processing core(s) 220 may be constructed from any number of transistors or other discrete circuit elements, which may individually or collectively assume any number of states. More specifically, the processing core(s) 220 may operate as a finite-state machine, in response to executable instructions contained within the software modules disclosed herein. These computer-executable instructions may transform the processing core(s) 220 by specifying how the processing core(s) 220 transitions between states, thereby transforming the transistors or other discrete hardware elements constituting the processing core(s) 220.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture in order to store and execute the software components presented herein. It also may be appreciated that the architecture may include other types of computing devices, including handheld computers, embedded computer systems, smartphones, and PDAs known to those skilled in the art. It is also contemplated that the architecture may not include all of the components shown in FIG. 2, may include other components that are not explicitly shown in FIG. 2, or may utilize an architecture completely different from that shown in FIG. 2.

Various exemplary embodiments of the present trusted cyber physical system are now presented by way of illustration and not as an exhaustive list of all embodiments. An example includes a trusted peripheral computing device accessible only from a trusted execution environment (TEE), the trusted peripheral computing device comprising: a network interface configured with a network communication stack; one or more processors in communication with the network interface; and one or more hardware-based memory devices storing computer-readable instructions which, when executed by the one or more processors, cause the trusted peripheral computing device to: receive a command at the network interface from a trusted proxy device; assemble the received command; and facilitate operation of a controllable device using information obtained from the command, such that the trusted peripheral computing device performs gateway functions between the trusted proxy device and the controllable device.

In another example, the network interface receives the command from a trusted port associated with the TEE of the trusted proxy device. In another example, the network communication stack is a TCP/IP stack, and the computer-readable instructions further cause the trusted peripheral computing device to assemble the received command using the TCP/IP stack. In another example, the network interface allows the trusted peripheral computing device to perform the gateway functions between the trusted proxy device and the controllable device, such that the trusted peripheral computing device is further configured to transmit data from the controllable device to the trusted proxy device. In another example, the trusted execution environment includes a configuration of trusted hardware that is isolated from a public environment on the trusted proxy device, in which the trusted peripheral computing device communicates with the trusted hardware within the TEE of the trusted proxy device. In another example, the trusted peripheral computing device and the controllable device are physically protected, and the command is cryptographically protected before entering the trusted peripheral computing device, in which the TEE and the cryptographic and physical protections form a trusted cyber physical system. In another example, a protocol utilized at the trusted peripheral computing device is either a same protocol as originally received at the trusted proxy device or the original protocol is translated to a different protocol executable by the controllable device.

A further example includes a method to secure a controllable device using a gateway device, wherein the gateway device includes at least a partially trusted processor and partially trusted memory on a System on Chip (SoC) device which operates within a trusted execution environment, the method comprising: receiving data; transporting the received data to the trusted execution environment; filtering the received data using an application layer gateway within the trusted execution environment; passing the data to a trusted peripheral device that functions as a communicatory gateway between the controllable device and the SoC device.

In another example, the trusted peripheral device is configured to utilize proprietary protocol mechanisms that are unique to the controllable device and different from the protocol mechanisms used within the transmitted data. In another example, the data is cryptographically secured before entering the gateway device and while traversing through at least a portion of the gateway device. In another example, the trusted peripheral device is configured to only receive data from and transmit data to an outgoing port on the gateway device which operates within the trusted execution environment. In another example, the data includes one or more of commands or confidential information. In another example, the method further comprises a watchdog counter that causes the gateway device to: reset or receive an update from a remote service upon the watchdog counter timing out; or reset or receive the update from the remote service at a time selected by the gateway device. In another example, the watchdog counter times out when an event is not periodically satisfied. In another example, the watchdog counter is satisfied upon receipt of an encrypted token from the remote service.

A further example includes one or more hardware-based computer-readable memory devices storing instructions which, when executed by one or more processors disposed in a computing device operating in a trusted cyber physical system, cause the computing device to: decrypt a received transmission upon entering a secure environment on the computing device, in which the computing device is further configured with an unsecure public environment; examine data within the transmission to verify the transmission is authorized; and forward the transmission to a trusted peripheral device which includes a communication stack to transport the transmission, wherein the trusted peripheral device operates within the secure environment, and after examination the transmission is routed only within the secure environment on the computing device.

In another example, the instructions further cause the computing device to: compare the transmission to baseline policy requirements; approve the transmission when the baseline policy requirements are satisfied; and deny the transmission when the baseline policy requirements are not satisfied. In another example, the baseline policy requirements are minimum or maximum parameters within which a controllable device is set to operate. In another example, the instructions further cause the computing device to trigger an operation log for transmissions that affect an operation associated with a controllable device to which the transmission is delivered. In another example, the operation log is triggered when the operation requires administration override.

The subject matter described above is provided by way of illustration only and is not to be construed as limiting. Various modifications and changes may be made to the subject matter described herein without following the example embodiments and applications illustrated and described, and without departing from the true spirit and scope of the present invention, which is set forth in the following claims.

What is claimed:

1. A method performed by a gateway device comprising a public environment and a secure environment for data transmissions to a controllable device and a trusted peripheral device, the method comprising:
   receiving, at the gateway device from a remote source that includes a trusted execution environment (TEE), encrypted data comprising a command to the controllable device, the gateway device including a TEE implemented on a System on Chip (SoC) including a trusted processor and a trusted memory;
   producing decrypted data by decrypting the encrypted data in the TEE on the SoC in which the decrypted data is limited to the secure environment comprising the TEE on the SoC and the trusted peripheral device and in which the decrypted data is excluded from the public environment;
   determining that access to the controllable device is authorized; and
   providing the command to the controllable device by passing the decrypted data to the trusted peripheral device which functions as a communicatory gateway that excludes the command from the public environment, wherein the trusted peripheral device implements authorized access to the controllable device, and wherein the trusted peripheral device is only accessible from the TEE on the SoC, wherein the TEE on the remote source and the TEE on the SoC are protected by cryptographically-implemented security and the trusted peripheral device and controllable device are protected by physically-implemented security.

2. The method of claim 1, wherein the controllable device comprises infrastructure hardware.

3. The method of claim 1, wherein one of the controllable device or trusted peripheral device is protected with physically-implemented security.

4. The method of claim 1, wherein the controllable device stores confidential information.

5. The method of claim 4, wherein the controllable device transmits the confidential information through the TEE on the SOC to a requesting device.

6. The method of claim 5, further including filtering the decrypted data using an application layer gateway in the TEE on the SoC.

7. The method of claim 6, wherein the transmission of the confidential information is performed responsively to verification by the application layer gateway.

8. A system comprising a public environment and a secure environment, comprising:
   a trusted execution environment (TEE) implemented in the secure environment on a System on Chip (SoC) including a trusted processor and a trusted memory which cause the TEE to decrypt encrypted data from a remote source that includes a TEE and determine authorization for forwarding the decrypted data as a command to a controllable device; and
   a trusted peripheral device, comprising a processor and a memory, in communication with the TEE, the trusted peripheral device providing a communicatory gateway function between the TEE and the controllable device that excludes the command from the public environment, wherein the trusted peripheral device implements authorized access to the controllable device, and wherein the trusted peripheral device is only accessible from the TEE on the SoC, wherein the TEE on the remote source and the TEE on the SoC are protected by cryptographically-implemented security and the trusted peripheral device and controllable device are protected by physically-implemented security,
   wherein the decrypted data is limited to the secure environment comprising the TEE on the SoC and the trusted peripheral device and wherein the decrypted data is excluded from the public environment.

9. The system of claim 8, wherein the trusted peripheral device includes a transmission control protocol/internet protocol (TCP/IP) communication stack.

10. The system of claim 8, further including an application layer gateway for filtering the data against predetermined criteria.

11. The system of claim 10, wherein the application layer gateway comprises an Open Platform Communications-Unified Architecture (OPC-UA) server, an OPC-UA client, and a message router.

12. The system of claim 8, further including a serial peripheral interface (SPI) bus coupling the SoC to the trusted peripheral device.

13. The system of claim 8, further including a cryptographic security layer for handling the data in the TEE.

14. The system of claim 13 wherein the security layer comprises a secure sockets layer (SSL).

15. A non-transitory computer-readable memory device storing instructions which, when executed by a System on Chip (SoC) including a trusted processor and a trusted memory, cause a gateway device, that includes a public environment and further includes the SoC and a trusted peripheral device, to:
  implement a trusted execution environment (TEE) on the SoC, wherein the trusted peripheral device is only accessible from the TEE, the TEE on the SoC and trusted peripheral device implementing a secure environment;
  receive an encrypted transmission, comprising a command for a controllable device, from a remote source that includes a TEE;
  verify that access to the controllable device is authorized;
  approve access to the controllable device; and
  provide the command to the controllable device by decrypting the encrypted data in the TEE on the SoC and passing the decrypted data to the trusted peripheral device which functions as a communicatory gateway that excludes the command from the public environment and implements the approved access to the controllable device, wherein the TEE on the remote source and the TEE on the SoC are protected by cryptographically-implemented security and the trusted peripheral device and controllable device are protected by physically-implemented security,
  wherein the decrypted data is limited to the secure environment comprising the TEE on the SoC and the trusted peripheral device and wherein the decrypted data is excluded from the public environment.

16. The non-transitory computer-readable memory device of claim 15, wherein the executed instructions further cause the gateway device to determine whether content in the transmission is safe or malicious.

17. The non-transitory computer-readable memory device of claim 15 in which the instructions further cause the gateway device to:
  compare the transmission to baseline policy requirements;
  approve the transmission to the controllable device responsively to the baseline policy requirements being satisfied; and
  deny the transmission to the controllable device responsively to the baseline policy requirements not being satisfied.

18. The non-transitory computer-readable memory device of claim 17, wherein the baseline policy requirements include minimum or maximum parameters within which the controllable device is set to operate.

19. The non-transitory computer-readable memory device of claim 15, wherein the instructions further cause the gateway device to trigger an operation log for transmissions that affect an operation associated with a controllable device to which the transmission is delivered.

20. The non-transitory computer-readable memory device of claim 19, wherein the operation log is triggered when the operation requires administration override.

* * * * *